United States Patent
Pilney et al.

(10) Patent No.: US 11,547,107 B2
(45) Date of Patent: Jan. 10, 2023

(54) SELF-PROPELLED AGRICULTURAL SPRAYER

(71) Applicant: CNH Industrial America LLC, New Holland, PA (US)

(72) Inventors: Brian J. Pilney, West Bend, WI (US); Richard J. Krummel, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 176 days.

(21) Appl. No.: 16/812,651

(22) Filed: Mar. 9, 2020

(65) Prior Publication Data
US 2020/0205392 A1    Jul. 2, 2020

Related U.S. Application Data

(62) Division of application No. 15/131,433, filed on Apr. 18, 2016, now Pat. No. 10,701,925.

(60) Provisional application No. 62/153,783, filed on Apr. 28, 2015.

(51) Int. Cl.
*A01M 7/00* (2006.01)
*A01C 23/00* (2006.01)

(52) U.S. Cl.
CPC ......... *A01M 7/0071* (2013.01); *A01C 23/008* (2013.01); *A01M 7/0082* (2013.01)

(58) Field of Classification Search
CPC .. A01M 7/005; A01M 7/0078; A01M 7/0071; A01M 7/0082; A01M 7/0057; A01C 23/008
USPC .................................................. 239/159–170
See application file for complete search history.

(56) References Cited

U.S. PATENT DOCUMENTS

| | | |
|---|---|---|
| 3,866,834 A | 2/1975 | Shannon |
| 4,154,451 A | 5/1979 | Young |
| 4,536,002 A | 8/1985 | Osborn |
| 4,709,857 A | 12/1987 | Wilger |
| 4,739,930 A | 4/1988 | Pask |
| 4,746,065 A | 5/1988 | Gorder |
| 4,768,715 A | 9/1988 | Sali et al. |
| 4,828,177 A | 5/1989 | Schuitemaker |
| 4,878,616 A | 11/1989 | Richardson |
| 4,944,355 A | 7/1990 | Karchewski |
| 5,154,240 A * | 10/1992 | Carrick ............... A01B 73/067 280/491.1 |
| 5,178,328 A | 1/1993 | Broyhill |
| 5,251,704 A | 10/1993 | Bourgault et al. |

(Continued)

FOREIGN PATENT DOCUMENTS

CA       1258835       4/2015

OTHER PUBLICATIONS

Hiniker; HD Series Mid-Mounted Booms, Apr. 7, 2015: http://www.hiniker.com/ag_products%20new/sp_mid-mountboom.html.

(Continued)

*Primary Examiner* — Christopher R Dandridge
(74) *Attorney, Agent, or Firm* — Rebecca Henkel; Rickard DeMille

(57) ABSTRACT

A deflectable touchdown wheel system for a sprayer boom of an agricultural sprayer is provided that includes a touchdown wheel that deflects transversely when contacting the ground at an angle, damping ground contact impact forces at the sprayer boom, reducing reactionary forces such as external steering inputs at the sprayer vehicle.

16 Claims, 4 Drawing Sheets

(56) References Cited

U.S. PATENT DOCUMENTS

| | | | |
|---|---|---|---|
| 5,465,456 A | 11/1995 | Fellhauer et al. | |
| 5,669,452 A | 9/1997 | Wright | |
| 5,673,854 A | 10/1997 | Kinder | |
| 5,755,382 A | 5/1998 | Skotinkov | |
| 6,027,039 A * | 2/2000 | Mercil | A01M 7/0075 239/159 |
| 6,374,922 B1 | 4/2002 | Friggstad | |
| 6,422,483 B1 * | 7/2002 | Yocom | A01M 7/0075 239/161 |
| 6,431,475 B1 | 8/2002 | Williams | |
| 6,869,025 B2 | 3/2005 | Guesdon | |
| 7,040,552 B2 | 5/2006 | McCrea | |
| 7,150,419 B1 | 12/2006 | Tomlonovic et al. | |
| 7,364,096 B1 * | 4/2008 | Sosnowski | A01M 7/0075 239/168 |
| 8,028,927 B2 | 10/2011 | Ward et al. | |
| 8,235,133 B2 | 8/2012 | Friggstad | |
| 8,833,680 B2 | 9/2014 | Ellingson et al. | |
| 9,258,938 B2 | 2/2016 | Prickel et al. | |
| 10,701,925 B2 * | 7/2020 | Pilney | A01M 7/0082 |
| 2006/0118654 A1 | 6/2006 | Shivak | |
| 2014/0361093 A1 * | 12/2014 | Alig | B65H 75/4489 239/159 |

OTHER PUBLICATIONS

Northstar; Spray Booms, Apr. 7, 2015, http://www.northstarattachments.com/pdf.LW-5190.pdf.

* cited by examiner

SELF-PROPELLED AGRICULTURAL SPRAYER

CROSS-REFERENCE TO RELATED APPLICATION

This application is a division of U.S. application Ser. No. 15/131,433, filed Apr. 18, 2016, which claims the benefit of U.S. Application. No. 62/153,783 filed Apr. 28, 2015.

FIELD OF THE INVENTION

The invention relates generally to agricultural product application equipment such as self-propelled sprayers and, in particular, to a deflectable touchdown wheel system for a sprayer boom.

BACKGROUND OF THE INVENTION

Some sprayer booms have touchdown wheels to contact the ground when the boom moves toward the ground to prevent direct contact of the boom with the ground. The touchdown wheels can include pneumatic tires or have some vertical suspension travel to absorb some of the contact-induced shock loading. Some touchdown wheels are castor mounted to maintain their forward heading during contact with the ground. Regardless of whether the touchdown wheels have pneumatic tires and/or are suspension or castor mounted, when touchdown wheels contact the ground, they tend to create a drag at or transmit enough of the shock load through the corresponding side of the boom which can result in an external steering input to the sprayer vehicle. Sprayer boom widths are increasing over time to allow increased coverage in a single spraying pass. The wider booms provide longer lever arms relative to the sprayer vehicle, which increases the steering input to the sprayer vehicle when the touchdown wheels contact the ground.

SUMMARY OF THE INVENTION

A deflectable touchdown wheel system for a sprayer boom of an agricultural sprayer is provided that includes a touchdown wheel that deflects transversely when contacting the ground at an angle, damping ground contact impact forces at the sprayer boom, reducing reactionary forces such as external steering inputs at the sprayer vehicle.

According to one aspect of the invention, the deflectable touchdown wheel system has a deflectable touchdown wheel that is pivot mounted from above to allow side-to-side angular deflection to soften the ground contacts and minimize external steering inputs to the sprayer vehicle during ground contacts. When the touchdown wheel contacts the ground, if the wheel is angled or not perpendicular with respect to the ground, then contact-induced shock loads are absorbed by angularly deflecting the wheel support yoke and further compressing a corresponding one of the springs. When the touchdown wheel lifts away from the ground, the spring compressed by the deflection of the wheel support yoke extends and pushes a tab of the wheel support yoke away from the direction it moved during deflection, restoring the touchdown wheel to the neutral position.

According to one aspect of the invention, the deflectable touchdown wheel system has a boom mounting bracket and wheel support that cooperate to permit transverse movement of a touchdown wheel. The boom mounting bracket is attached to the boom. The wheel support defines a yoke that carries the touchdown wheel at its lower end. An upper end of the wheel support yoke is mounted by a pivot pin to the boom mounting bracket, with the pivot pin arranged perpendicularly with respect to the longitudinal axis of the boom. A spring arrangement is provided between the boom mounting bracket and the wheel support yoke. The spring arrangement has two longitudinally aligned springs held in a spring bracket that is connected to the boom mounting bracket. A tab at the upper end of the wheel support yoke is sandwiched between inner ends of the springs.

According to another aspect of the invention, a deflectable touchdown wheel system is provided for use with a sprayer boom of an agricultural sprayer. The deflectable touchdown wheel system includes a mounting system configured to support the deflectable touchdown wheel system from the sprayer boom. A wheel support is movably mounted relative to the mounting system. A wheel is supported for rotation in the wheel support and configured to contact a ground surface during touchdown events of the sprayer boom. A deflection arrangement is provided between the mounting system and the wheel support. The deflection arrangement accommodates transverse movement of the wheel support relative to a travel direction of agricultural sprayer during touchdown events.

According to another aspect of the invention, the deflection arrangement may include a pivot system defining a pivot axis arranged transversely with respect to a longitudinal axis of the sprayer boom and/or parallel to a travel direction of the sprayer. The deflection arrangement may pivot mount the wheel from above, with the pivot axis arranged above and generally aligned with a longitudinal centerline of the wheel.

According to another aspect of the invention, the mounting system may include a boom mounting bracket connected to the sprayer boom. The deflection arrangement may be connected to an end of the boom mounting bracket. The deflection arrangement may include a pivot block and a pivot pin extending through the pivot block for movably mounting the wheel support to the boom mounting bracket. The wheel support may include a wheel support yoke having a pair of legs extending on opposite sides of the wheel. The pivot block may have a block pivot hole and the wheel support yoke may include an upper body segment with a yoke pivot hole aligned with the block pivot hole. The pivot pin extends through the block and yoke pivot holes for allowing movement of the wheel support yoke relative to the boom mounting bracket by way of a pivot axis defined by the pivot pin. The pivot pin and its pivot axis maybe arranged above the wheel and transversely with respect to a rotational axis of the wheel. The deflection arrangement may include a biasing system arranged to restore the wheel from a deflected position to a neutral position. The biasing system may include at least one spring for restoring the wheel to the neutral position, such as a pair of springs on opposite sides of the wheel support with each spring of the pair of springs configured to compress during a touchdown event to absorb energy of the touchdown event and extend after the touchdown event to restore the wheel support to neutral position.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
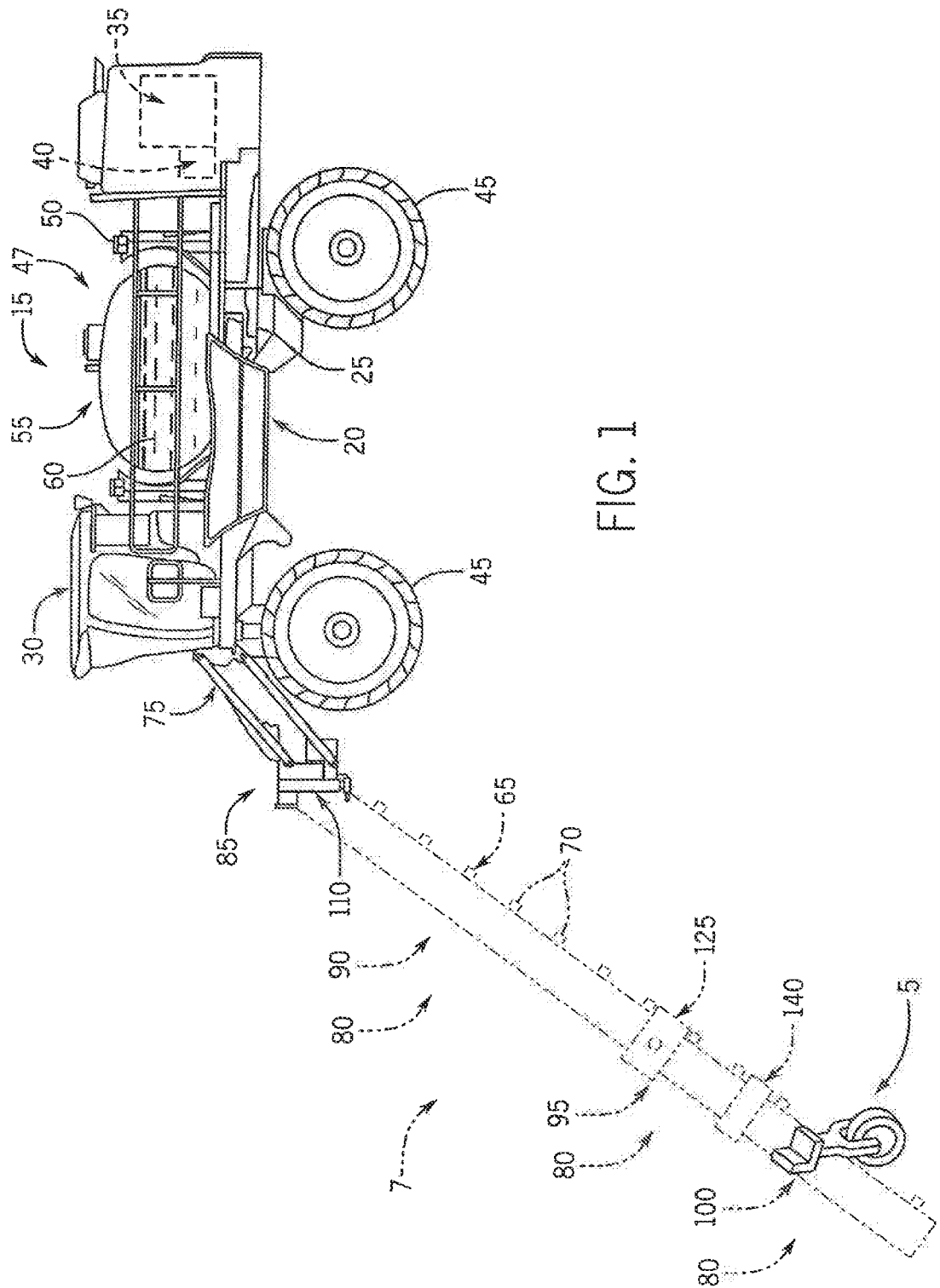
FIG. 1 is a side elevation of a self-propelled sprayer with a deflectable touchdown wheel system according to the present invention.

Referring now to the drawings and specifically to FIG. 1, a deflectable touchdown wheel system 5 is shown used with boom 7 for damping ground contact impact forces at the boom 7 during boom touchdown events, as explained in greater detail elsewhere herein, and is shown incorporated on an agricultural sprayer. The agricultural sprayer is shown here as a self-propelled agricultural sprayer vehicle or self-propelled sprayer 15. Although sprayer 15 is shown as a front-mounted boom self-propelled sprayer, it is understood that self-propelled versions of sprayer 15 can have either front-mounted or rear-mounted booms, such as those available from CNH Industrial, including the Miller Nitro and Condor Series sprayers and New Holland Guardian Series sprayers.

Figure 2:
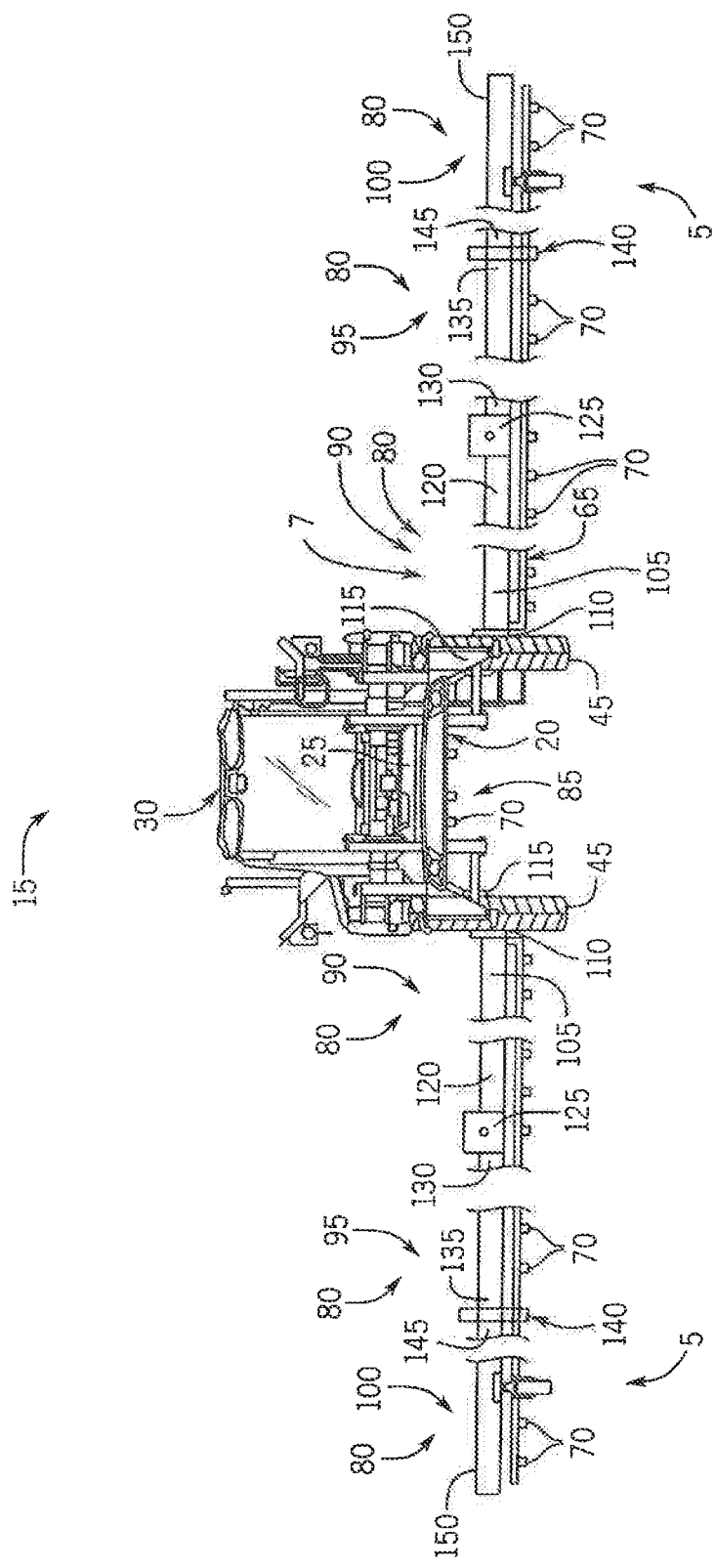
FIG. 2 is a front elevation of a self-propelled sprayer with a deflectable touchdown wheel system according to the present invention

Still referring to FIG. 1, sprayer 15 includes chassis 20 having chassis frame 25 that supports various assemblies, systems, and components. These various assemblies, systems, and components include cab 30, engine 35, and hydraulic system 40. Hydraulic system 40 receives power from engine 35 and includes at least one hydraulic pump which may be in a hydrostat arrangement for providing hydraulic pressure for operating hydraulic components within the hydraulic system 40. For sprayers with hydrostatic drives, hydraulic motors are operably connected to the hydraulic pump(s) for rotating wheels 45. In mechanical drive applications, a mechanical transmission receives power from engine 35 and delivers power for rotating wheels 45 by way of power-transmitting driveline components such as drive shafts, differentials, and other gear sets in portal, drop boxes, or other housings. Spray system 47 includes storage containers such as rinse tank 50 storing water or a rinsing solution, and product tank 55 that stores a volume of product 60 for delivery onto an agricultural field with sprayer 15. Product 60 includes any of a variety of agricultural liquid products, such as various pesticides, herbicides, fungicides, liquid fertilizers, and other liquids including liquid suspensions beneficial for application onto agricultural fields. A product delivery pump conveys product 60 from product tank 55 through plumbing components such as interconnected pieces of tubing and through a boom tubing system 65 for release out of spray nozzles 70 that are spaced from each another along the width of boom 7 during spraying operations of sprayer 15. Referring now to FIG. 2, groups or banks of multiple adjacent spray nozzles 70 define multiple spray sections 72 of spray system 47. Spray sections 72 are defined along boom 7 and selectively deliver product 60 for release onto an agricultural field at locations corresponding to positions of activated spray sections 72. Boom 7 is connected to chassis 20 with lift arm assembly 75 (FIG. 1) that is configured to move the boom 7 up and down for adjusting the height of application of the product 60.

Still referring to FIG. 2, boom 7 includes multiple boom segments 80 connected longitudinally to provide the corresponding width of the assembled boom 7. Boom segments 80 include center section 85 and left and right boom arms extending in opposite directions from center section 85. Left and right boom arms have multiple segments with pairs of primary boom segments 90, secondary boom segments 95, and breakaway boom segments 100 extending in opposite directions along the respective left and right boom arms mirrored about a longitudinal axis of the sprayer 15. The corresponding left and right segments of the pairs of primary, secondary, and breakaway boom segments 90, 95, 100 are substantially identical, so only one will be described, with the description applying to both the left and right segments of left and right boom arms. Primary boom segment 90 has a primary boom inner end 105 that is connected with hinge 110 to center section outer end 115, with hinge 110 configured to allow for generally rearward horizontal pivoting of the boom primary, secondary, and breakaway segments 90, 95, 100 toward the chassis 20 when folding boom 7 to achieve a stored position. Primary boom segment 90 extends from primary boom inner end 105 away from center section 85 to primary boom outer end 120. Hinge 125 is arranged between primary boom outer end 120 and secondary boom inner end 130 and is configured to allow for folding the secondary and breakaway segments 95, 100 relative to primary boom segment 90 to achieve the stored position. For horizontal folding of secondary and breakaway segments 95, 100 against the primary boom segment 90, the hinge 125 allows horizontal pivoting of the secondary and breakaway segments 95, 100 toward primary boom segment 90. For vertical folding of secondary and breakaway segments 95, 100 against the primary boom segment 90, the hinge 125 allows vertical pivoting of the secondary and breakaway segments 95, 100 toward primary boom segment 90. Secondary boom segment 95 extends from secondary boom inner end 130 away from primary boom segment 90 to secondary boom outer end 135. Breakaway joint 140 is arranged between secondary boom outer end 135 and breakaway boom inner end 145 and is configured to allow for momentary deflecting of the breakaway boom segment 100 away from its outwardly extended position during collisions with the crops, the ground, and/or other obstacles. Breakaway boom segment 100 extends from breakaway boom inner end 145 away from secondary boom segment 95 to breakaway boom outer end 150. In the stored position of boom 7, the secondary and breakaway boom segments 95, 100 are folded against the primary boom segment 90. The primary boom segment 90 is folded toward chassis 20 so that the breakaway boom outer end 150 is near the primary boom inner end 105 tucked toward the front of sprayer 15 with the primary boom outer end 120 and secondary boom inner end 130 tucked toward the back of sprayer 15. Deflectable touchdown wheel system 5 is shown arranged at the breakaway boom outer end 115, although it is understood that deflectable touchdown wheel system 5 may be arranged elsewhere on boom 7 while still allowing the deflectable touchdown wheel system 5 to contact the ground during boom touchdown events and damp corresponding ground contact impact forces at the boom 7.

Figure 3:
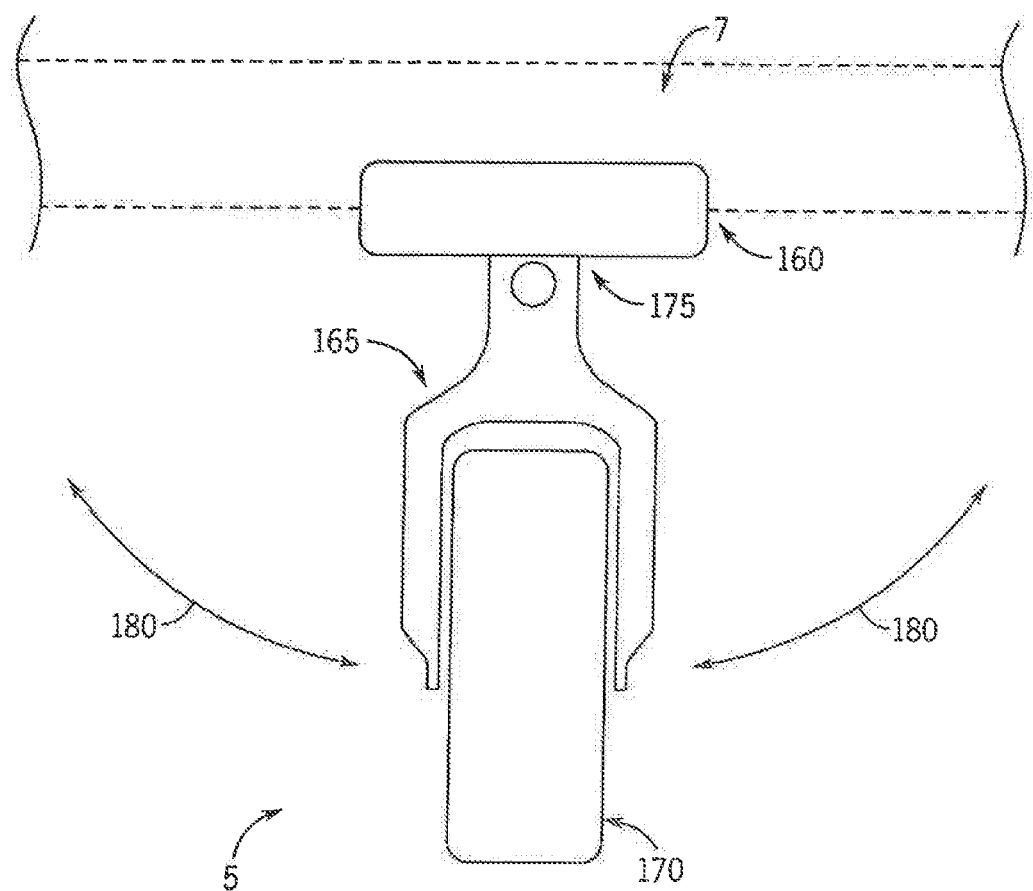
FIG. 3 is a simplified schematic representation of a front elevation of a deflectable touchdown wheel system according to the present invention.

Referring now to FIG. 3, deflectable touchdown wheel system 5 is configured to absorb energy by side-to-side angular deflection of components of the touchdown wheel system 5 to soften the touchdown events and minimize ground contact-induced external steering inputs to the sprayer 15. Deflectable touchdown wheel system 5 includes mounting system 160 connected to boom 7. Wheel support 165 is supported by way of a movable connection to mounting system 160 and thus the wheel support is also movably mounted relative to boom 7. Touchdown wheel 170 is supported for rotation in wheel support 165 and configured to contact a ground surface during touchdown events of boom 7. Deflection arrangement 175 provides the movable connection between mounting system 160 and wheel support 165. Deflection arrangement 175 accommodates transverse movement of the wheel support 165 relative to a travel direction of agricultural sprayer during touchdown events. This is represented by the curved arrows showing side-to-side deflection movement paths 180 of the wheel support 165 and wheel 170.

Figure 4:
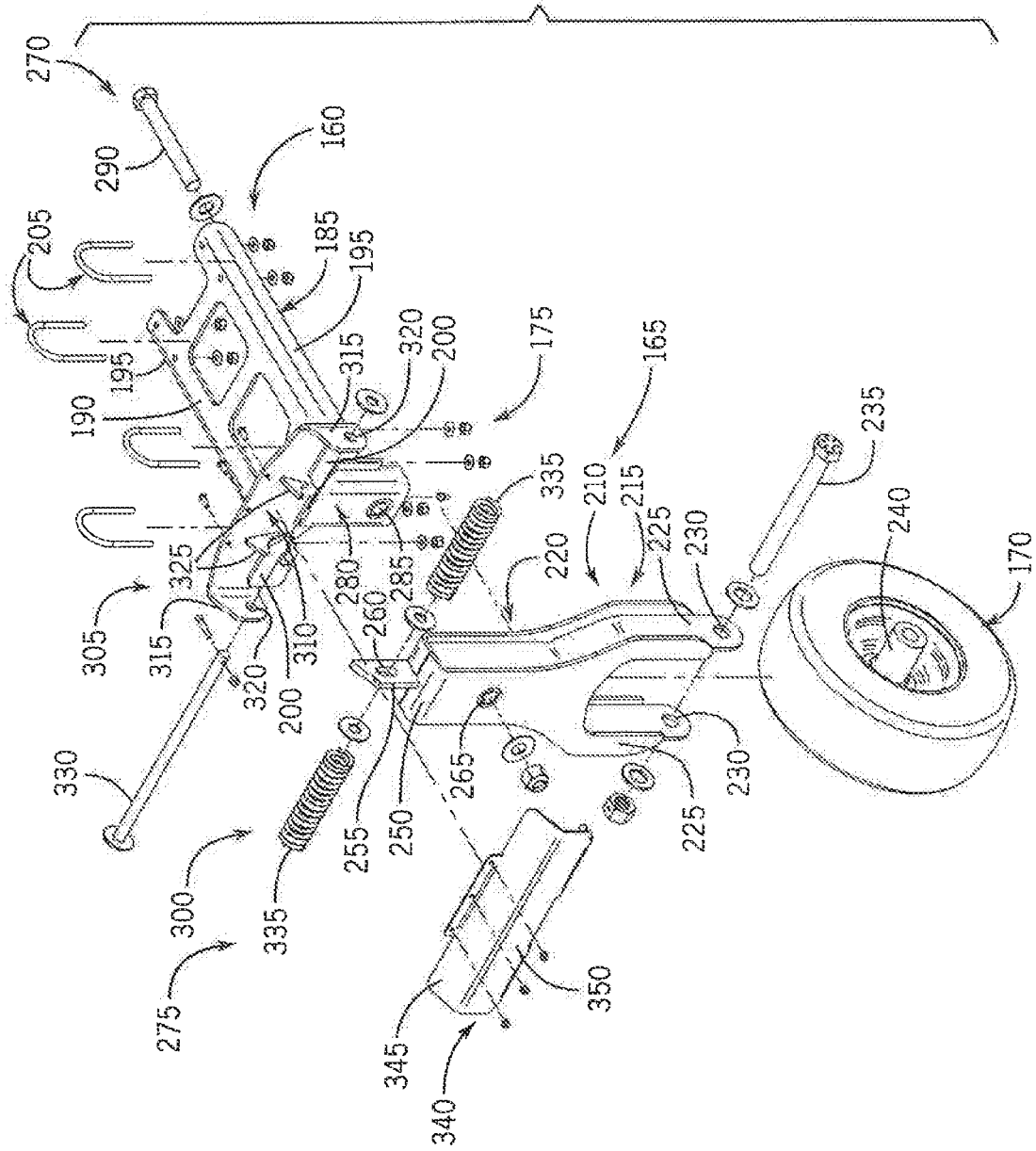
FIG. 4 is an exploded isometric view of a deflectable touchdown wheel system according to the present invention.

Referring now to FIG. 4, mounting system 160 includes boom mounting bracket 185 that attaches to boom 7 for supporting deflectable touchdown wheel system 5 from boom 7. Boom mounting bracket 185 had a generally flat upper wall 190 and a pair of flanges 195 extending downwardly from outer side segments of upper wall 190 and a pair of fingers 200 extending upwardly from an end of the upper wall 190. Boom mounting bracket 185 may attach to boom 7 by welding or by way of hardware connection such as fasteners 205 shown here as U-bolts.

Still referring to FIG. 4, wheel support 165 includes a wheel support yoke shown as yoke 210 with lower and upper yoke body segments 215, 220. Lower yoke body segment 215 has a pair of spaced apart legs 225 with holes 230 that receive axle 235 that extends through a hub 240 of wheel 170. Axle 235 is shown as an axle bolt with a nut that secures axle 235 in lower ends of legs 225 of yoke 210. Upper yoke body segment 220 includes upper wall 250 and tab 255 with an elongate hole 260 that extends upwardly from upper wall 250, along a centerline of yoke 210. Yoke pivot hole 265 extends through upper yoke body segment 220, perpendicularly with respect to axle 235, and allows for connecting yoke 210 to mounting system 160 by way of deflection arrangement 175.

Still referring to FIG. 4, deflection arrangement 175 includes pivot system 270 and biasing system 275. Pivot system 270 includes pivot block 280 connected to boom mounting bracket 185 and having block pivot hole 285. Block and yoke pivot holes 285, 265 are aligned with each other and receive pivot pin 290. In this way, wheel 170 is pivot mounted from above through a pivot axis defined by pivot pin 290 which may be generally aligned with a longitudinal centerline of wheel 170. The pivot axis of pivot pin 290 is shown arranged transversely with respect to the longitudinal axis of boom 7 and parallel to a travel direction of the sprayer 15. This provides pivot mounting of yoke 210 to allow wheel 170 to move along a pendulum-like path when deflecting, transversely with respect to a travel direction of sprayer 15. After a touchdown event, the deflected yoke 210 and wheel 170 are returned to a neutral position, perpendicularly down from boom 7 (FIG. 3), by biasing system 275.

Still referring to FIG. 4, biasing system 275 includes spring arrangement 300 that includes at least one spring for restoring the wheel to the neutral position. Spring arrangement 300 has spring bracket 305 that is connected to boom mounting bracket 185. Spring bracket 305 has a back plate 310 supported from below by upper wall 190 and supported from the outside by the fingers 200 of boom mounting bracket 185. Spring bracket 305 includes a pair of bracket ears 315 with aligned holes 320 extending outwardly from back plate 310 at opposite sides of spring bracket 305. A pair of spaced apart stops 325 is arranged inwardly of bracket ears 315 extending outwardly from an intermediate portion of back plate 310. Stops 325 are angled with respect to each other and away from vertical so that contact between tab 255 and stops 325 is through face-to-face surface engagements of respective surfaces of tab 255 and stops 325 during the movement-limiting contacts. Spring pin 330 extends through holes 320 of bracket ears 315, supporting a pair of longitudinally aligned springs 335 arranged concentrically outside of spring pin 330. In this arrangement, deflection of wheel 170 in a first transverse direction compresses one of the springs 335 in the opposite direction. When wheel 170 deflects in a left-hand direction, tab 255 moves in a right-hand direction which compresses right-hand spring 335 between tab 255 and the right-hand bracket ear 315, with the travel of the wheel 170 limited when tab 255 contacts the right-hand stop 325. When wheel 170 deflects in a right-hand direction, tab 255 moves in a left hand direction which compresses the left-hand spring 335 between tab 255 and the left-hand bracket ear 315, with the travel of the wheel 170 limited when tab 255 contacts the left-hand stop 325. Cover 340 is attached to back plate 310 of spring bracket 305. Cover 340 has an upper wall 345 extending generally perpendicularly away from back plate 310 of spring bracket 305 and outer wall 350 that extends downwardly from an outer edge of upper wall 345, generally parallel to back plate 310. Bracket ears 315 nest within spaces provided at side openings defined by side edges of upper and outer walls 345, 350 of the cover 340. In this way, back plate 310 and bracket ears 315 of spring bracket 305 and upper and outer walls 345, 350 of cover 340 cooperate to provide an enclosure for the springs 335, with an open bottom accommodating movement of yoke 210 through inside space defined within the enclosure.

During use, when wheel 170 contacts the ground to define a touchdown event, if the wheel is angled or not perpendicular with respect to the ground, then contact-induced shock loads are absorbed by angularly deflecting the wheel support yoke 210 and further compressing a corresponding one of the springs 335. After completion of the touchdown event, when the wheel 170 lifts away from the ground, the spring 335, compressed by the deflection of the wheel support yoke 210, extends and pushes the tab 255 of the wheel support yoke 210 away from the direction it moved during deflection, restoring the touchdown wheel 170 to the neutral position (FIG. 3).

Many changes and modifications could be made to the invention without departing from the spirit thereof. The scope of these changes will become apparent from the appended claims.

We claim:
1. A self-propelled agricultural sprayer, comprising:
a chassis having wheels for moving the self-propelled agricultural sprayer;
at least one storage container supported by the chassis, the at least one storage container storing a volume of a product for delivery to an agricultural field;
a sprayer boom supported by the chassis and defining spray sections for delivering the product to the agricultural field; and
a deflectable touchdown wheel system connected to the boom and including:
a wheel support movably mounted to a first spray section of the spray sections;

a wheel supported for rotation in the wheel support and configured to contact a ground surface during touchdown events of the sprayer boom; and a deflection arrangement defining a pivot axis about which the wheel rotates, the pivot axis positioned vertically below the first spray section of the spray sections, with the deflection arrangement comprising:

a pivot block, a pivot pin, and a biasing system, wherein the biasing system includes a pair of springs on opposite sides of the wheel support for restoring the wheel from a deflected position to a neutral position, each spring configured to compress during the touchdown events, absorb energy of the touchdown events, and extend after the touchdown events, restoring the wheel to the neutral position.

2. The self-propelled agricultural sprayer of claim 1, wherein the deflection arrangement is configured to accommodate transverse movement of the wheel support relative to a travel direction of the self-propelled agricultural sprayer during the touchdown events.

3. The self-propelled agricultural sprayer of claim 1, wherein the wheel support comprises a wheel support yoke including a lower yoke body segment with a pair of legs extending on the opposite sides of the wheel and an upper yoke body segment extending from the lower yoke body segment toward the deflection arrangement.

4. The self-propelled agricultural sprayer of claim 3, further comprising a boom mounting bracket connected to the first spray section of the spray sections and configured to support the wheel support.

5. The self-propelled agricultural sprayer of claim 4, wherein the boom mounting bracket is coupled with the pivot block of the deflection arrangement and wherein the pivot pin extends through the pivot block to define the pivot axis and for movably mounting the wheel support to the boom mounting bracket.

6. The self-propelled agricultural sprayer of claim 1, wherein the deflection arrangement comprises the biasing system arranged to restore the wheel from the deflected position to the neutral position.

7. The self-propelled agricultural sprayer of claim 6, wherein the biasing system comprises at least one of the springs to restore the wheel from the deflected position to the neutral position.

8. The self-propelled agricultural sprayer of claim 7, wherein the at least one spring includes the pair of springs on the opposite sides of the wheel support for restoring the wheel from the deflected position to the neutral position.

9. A self-propelled agricultural sprayer, comprising:
a chassis having wheels for moving the self-propelled agricultural sprayer;
at least one storage container supported by the chassis, the at least one storage container storing a volume of a product for delivery to an agricultural field;
a sprayer boom supported by the chassis and defining spray sections for delivering the product to the agricultural field; and
a deflectable touchdown wheel system connected to the boom and including:
a wheel support including a wheel support yoke;
a boom mounting bracket coupled with the sprayer boom and the wheel support yoke, wherein the wheel support yoke is movably mounted relative to the boom mounting bracket;
a wheel supported for rotation with the wheel support yoke relative to the boom mounting bracket, the wheel configured to contact a ground surface during a touchdown event of the sprayer boom; and
a deflection arrangement between the boom mounting bracket and the wheel support yoke, with the deflection arrangement comprising:
a pivot system defining a pivot axis defined by a pivot pin that is arranged parallel to a travel direction of the self-propelled agricultural sprayer and below the sprayer boom, wherein the pivot pin supports the wheel support to pivot about the pivot axis to accommodate transverse movement of the wheel support relative to the travel direction of the self-propelled agricultural sprayer during the touchdown event; and
a spring arrangement configured to bias the wheel support from a deflected position during the touchdown event to a neutral position after the touchdown event,
the spring arrangement including a pair of springs on opposite sides of the wheel support, each spring configured to compress during the touchdown event, absorb energy of the touchdown event, and extend after the touchdown event, restoring the wheel support to the neutral position.

10. The self-propelled agricultural sprayer of claim 9, wherein the wheel support comprises a yoke with a lower yoke segment extending below the pivot pin and an upper yoke segment extending above the pivot pin, and wherein the spring arrangement includes the pair of springs configured to push the upper yoke segment in opposite directions to bias the wheel support from the deflected position during the touchdown event to the neutral position after the touchdown event.

11. A deflectable touchdown wheel system connected to a sprayer boom of a self-propelled agricultural sprayer, the deflectable touchdown wheel system comprising:
a boom mounting bracket connected to a section of the boom;
a wheel support movably mounted to the boom mounting bracket;
a wheel supported for rotation in the wheel support and configured to contact a ground surface during touchdown events of the sprayer boom; and
a deflection arrangement positioned between the boom mounting bracket and the wheel support and configured to accommodate transverse movement of the wheel support relative to the section of the boom during the touchdown events, the deflection arrangement defining a pivot axis positioned below the section of the boom, the deflection arrangement comprising:
a pivot block, a pivot pin, and a biasing system, wherein the biasing system includes a pair of springs on opposite sides of the wheel support for restoring the wheel from a deflected position to a neutral position, each spring configured to compress during the touchdown events, absorb energy of the touchdown events, and extend after the touchdown events, restoring the wheel to the neutral position.

12. The self-propelled agricultural sprayer of claim 11, wherein the wheel support comprises a wheel support yoke including a lower yoke body segment with a pair of legs extending on opposite sides of the wheel and an upper yoke body segment extending from the lower yoke segment toward the deflection arrangement.

13. The self-propelled agricultural sprayer of claim 12, wherein the boom mounting bracket is operably coupled with the pivot block of the deflection arrangement and wherein the pivot pin extends through the pivot block to define a pivot axis and for movably mounting the wheel support to the boom mounting bracket.

14. The self-propelled agricultural sprayer of claim 11, wherein the deflection arrangement comprises the biasing system arranged to restore the wheel from the deflected position to the neutral position.

15. The self-propelled agricultural sprayer of claim 14, wherein the biasing system comprises at least one of the springs to restore the wheel from the deflected position to the neutral position.

16. The self-propelled agricultural sprayer of claim 15, wherein the at least one of the springs includes the pair of springs on the opposite sides of the wheel support for restoring the wheel from the deflected position to the neutral position.

* * * * *